Patented June 13, 1933

1,914,100

UNITED STATES PATENT OFFICE

HARRY BENNETT, OF BROOKLYN, NEW YORK

EMULSIFIABLE PRODUCT AND EMULSION OBTAINED THEREFROM

No Drawing. Application filed May 8, 1931. Serial No. 536,069.

The invention relates to a novel synthetic emulsifiable product of the nature of a wax, and it has for its object to provide a product of this character which is characterized by greater solubility in the usual wax solvents and particularly by its general high emulsification property, serving as an excellent agent in the preparation of stable emulsions, oils, waxes, fats, hydrocarbons, etc.

A further object of the invention resides in the provision of a product that is self-emulsifying, namely does not require any emulsifying agent to effect its dispersion in water and other solvents.

The invention has for a still further object a product having superior solubility, being capable of dissolving in turpentine to the extent of 15% and in alcohol to the extent of 5%.

The product utilized in preparing an emulsion is derived from dihydric alcohols as glycol (ethylene glycol) or compounds thereof such as diethylene or triethylene glycol or ethers of the same, with an acid of the higher members of the fatty acid series containing more than five carbon atoms to the molecule, such as stearic acid, myristic, lauric, linoleic acids, etc.

As a typical example, 102 parts by weight of triethylene glycol, 284 parts of stearic acid and 4 parts of sodium glycerophosphate, as a catalyst, are heated together at 200° C. in an autoclave for some two hours with vigorous agitation and under a pressure of 50 lbs. per square inch. In place of the glycerophosphate catalyst, other catalysts may be used such as sodium sulphite, bisulphite and tetraborate, or calcium chloride, anhydrous boric acid, etc. The charge, which has thereby been incompletely reacted and retains an appreciable amount of unreacted stearic acid, is then allowed to cool to 100° C. and the water distilled over in vacuo, whereupon the temperature is gradually raised to distill off the excess glycol under reduced pressure.

The reaction mass is then dissolved in benzol or naphtha and filtered, the solvent being thereafter distilled from the filtrate and the latter run onto chilled rolls from which the glycol stearate thus obtained is scraped off in waxy flakes or chips. This compound or product is odorless, colorless and tasteless, and non-corrosive, non-toxic and edible. It is, furthermore, soluble in alcohol, benzol, turpentine, etc., and affords with water or diluted alcohol a voluminous, gelatinous precipitate or dispersion.

With the aforesaid product, a very stable emulsion of a mineral oil is effected, for example, by melting 1 part of this synthetic wax with 5 parts of the mineral oil and vigorously stirring in 10 to 20 parts of water. A rich, creamy emulsion of great stability results from this procedure. By varying the amount of oil or water different consistencies are obtained.

Furthermore, if 1 part of the synthetic wax in melted condition be stirred in 10 or more parts of water, upon cooling a beautiful stable emulsion of the wax is had.

Moreover, the novel product is self-emulsifying, no alkali, sulphonated compound, soap, gum or amine being necessary to effect an emulsion of or with this wax.

The emulsions thus obtained of oils, fats, hydro-carbons, etc., are especially suitable for use in the preparation of cosmetics or directly for pharmaceutical purposes as they are entirely free from alkali, amines, sulphonated compounds, etc. which are irritant to the skin. If the water emulsion be mixed with 10 or more parts of alcohol, it may be applied to the hair or used for other cosmetic purposes where a voluminous, gelatinous, aqueous, waxy precipitate is desired. Furthermore, as the emulsifying agent is non-corrosive, non-toxic, edible and substantially colorless and tasteless, these emulsions may be utilized in the preparation of edible products.

For technical purposes, such as waterproofing, polishing, lubrication, spraying and other uses, the emulsions are also particularly useful. When the wax-like product is dissolved in solvents such as alcohol, benzol, turpentine, etc., and emulsified, and brush-sprayed, flowed or otherwise applied to surfaces or crevices, a film of wax is deposited after evaporation of the solvent and serves as a lubricant, waterproofing, corrosion preventative, etc. An excellent polish upon surfaces such as floors, linoleum, automobiles, leather, etc., results from such application of the compound. Water dispersions of these waxes are especially suitable for use in polishing rubber flooring as they will not injure the rubber or cause the colors to run.

The water dispersions of these waxes are unique in that they do not dry white like most other waxes but dry transparent when coated on a surface and, also, do not dry too hard to polish easily.

An emulsion of the aforesaid character is suitable as a medicinal compound such as a laxative, or a base for the same. Thus it may contain a minimum amount of water and a solid which is water-soluble, for example sugar. Or an insoluble solid such as charcoal and either with or without additional ingredients may be utilized, such as phenolphthalein and with or without flavoring materials, such as peppermint.

The novel water dispersion or emulsion with an addition of a mild abrasive as precipitated chalk and an antiseptic or medicament such as thymol and, if desired, a flavoring ingredient (oil of wintergreen and the like) affords an excellent tooth paste which is free from the usual objectionable taste of soap and also from the usual caustic action on the delicate membranes of the mouth.

Being an edible product and possessing also the property of thickening water solutions, it may be utilized for this purpose and, together with sugars, starches, gums, etc., in the preparation of various food products such as custards, pastries, etc. As an emulsion containing a minimum amount of water, it may be used with fats, oils and greases as a shortening agent in baking. In this connection, it has been found that the surface tension of the mix is considerably reduced, resulting in fluffier and lighter baked products. Such surface-tension reducing properties are unique in that they are absent entirely in the usual shortening agents.

I claim:

1. A water emulsion of a synthetic wax, consisting substantially of a dihydric alcohol completely esterified with a higher fatty acid having a carbon content greater than five, an excess of the fatty acid, and water.

2. As an emulsifying agent, the wax-like compounds consisting substantially of a dihydric alcohol completely esterified with a higher fatty acid having a carbon content greater than five, and an excess of the fatty acid.

3. A water emulsion of a synthetic wax, consisting substantially of a dihydric alcohol completely esterified with a higher fatty acid having a carbon content greater than five, an excess of the fatty acid, a catalyst having an alkaline base, and water.

4. As an emulsifying agent, the wax-like compound consisting of ethylene glycol completely esterified with stearic acid, and an excess of the stearic acid, said compound having an acid reaction and adapted for dispersion in water.

5. As an emulsifying agent, the wax-like compound consisting of a diethylene glycol completely esterified with stearic acid, and an excess of the stearic acid, said compound having an acid reaction and adapted for dispersion in water.

6. As an emulsifying agent, the wax-like compound consisting of triethylene glycol completely esterified with stearic acid, and an excess of the stearic acid, said compound having an acid reaction and adapted for dispersion in water.

7. As an emulsifying agent, the wax-like compound consisting of triethylene glycol completely esterified with stearic acid, an excess of the stearic acid, and sodium glycerophosphate, said compound having an acid reaction and adapted for dispersion in water.

In testimony whereof I affix my signature.

HARRY BENNETT.